United States Patent
Thomas, Jr.

(10) Patent No.: US 6,540,124 B1
(45) Date of Patent: Apr. 1, 2003

(54) SUPPORT SCAFFOLD FOR VEHICLE STORAGE COMPARTMENT

(76) Inventor: Charlie Thomas, Jr., 338 Florida St., Buffalo, NY (US) 14208

( * ) Notice: Subject to any disclaimer, the term of this patent is extended or adjusted under 35 U.S.C. 154(b) by 0 days.

(21) Appl. No.: 09/822,642

(22) Filed: Mar. 30, 2001

(51) Int. Cl.[7] ............................................. B60R 9/00
(52) U.S. Cl. ..................... 224/492; 224/497; 224/500; 224/501; 224/504; 224/520
(58) Field of Search ................. 224/492, 497, 224/500, 501, 502, 504, 520, 311, 314, 542, 549, 550, 551, 552, 553; 296/26.08, 26.09, 26.1, 26.11, 37.6

(56) References Cited

U.S. PATENT DOCUMENTS

| | | | |
|---|---|---|---|
| 1,932,951 A | | 10/1933 | Barieau |
| 2,172,405 A | * | 9/1939 | Powell ..................... 296/26.09 |
| 2,284,419 A | * | 5/1942 | Greig ......................... 224/510 |
| 2,470,314 A | * | 5/1949 | Lim ............................ 224/498 |
| 2,490,014 A | * | 12/1949 | Brand ......................... 224/491 |
| 2,545,269 A | * | 3/1951 | Ford ......................... 224/42.32 |
| 2,576,385 A | * | 11/1951 | Bigsby ..................... 224/42.33 |
| 2,643,395 A | * | 6/1953 | Stassinos .................... 224/542 |
| 2,772,041 A | | 11/1956 | Zeabari |
| 2,953,287 A | * | 9/1960 | Werner ..................... 224/42.32 |
| 2,995,283 A | | 8/1961 | Torkowski |
| 3,004,790 A | * | 10/1961 | Mayer ..................... 296/26.09 |
| 3,085,826 A | * | 4/1963 | Carreau ................... 296/26.11 |
| 3,726,422 A | * | 4/1973 | Zelin ....................... 296/26.09 |
| 4,029,245 A | | 6/1977 | Berlin |
| 4,461,413 A | | 7/1984 | Hoerner |
| 4,938,403 A | | 7/1990 | Cortelli |
| 5,088,635 A | | 2/1992 | Taylor et al. |
| 5,120,102 A | * | 6/1992 | Cumbie ..................... 296/26.1 |
| 5,452,773 A | | 9/1995 | Hrupka |

* cited by examiner

Primary Examiner—Stephen K. Cronin

(57) ABSTRACT

A portable, easily installed and uninstalled, support scaffold to carry oversize cargo in vehicle storage compartments. The device can be temporarily secured within the storage compartment, or if desired, the adjustable support frame can be permanently installed. The size of the support frame is adjustable in all three dimensions and includes an adjustable arm that is located on the rear end of the frame device. The arm extends outwardly from the frame to outside the compartment. There is an extension from the arm that can be adjusted to rest on the bumper or trailer hitch to provide extra support for the cargo that sits on the arm. If the cargo is so long that the center of mass is outside the compartment, the arm can be extended further outside the vehicle to prevent an additional moment from being placed on the contact between the cargo and the arm.

14 Claims, 2 Drawing Sheets

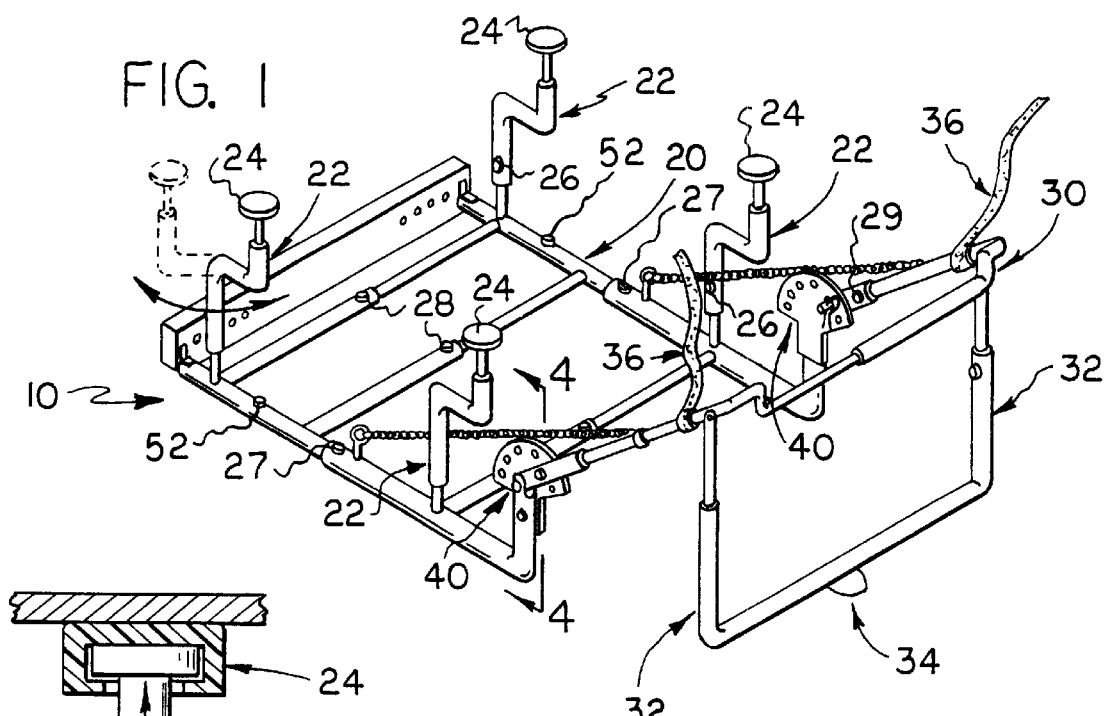
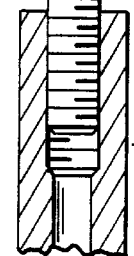
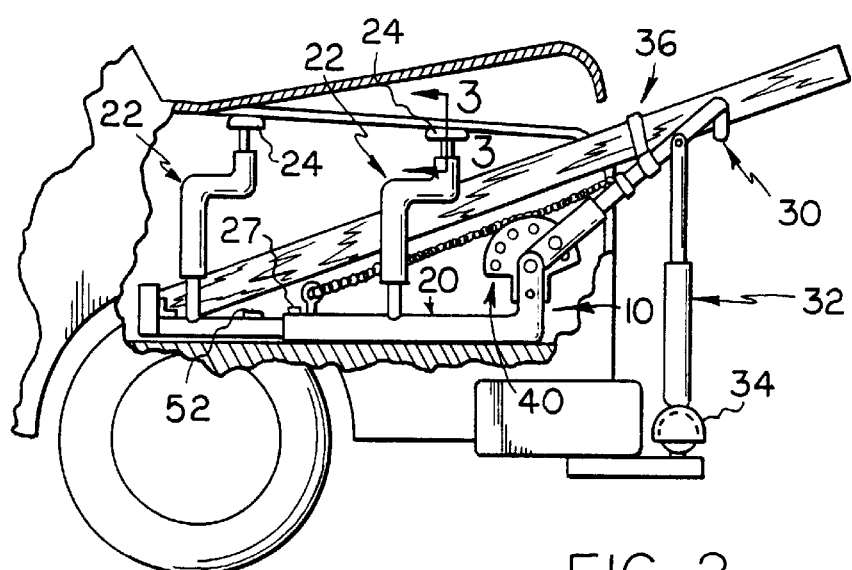

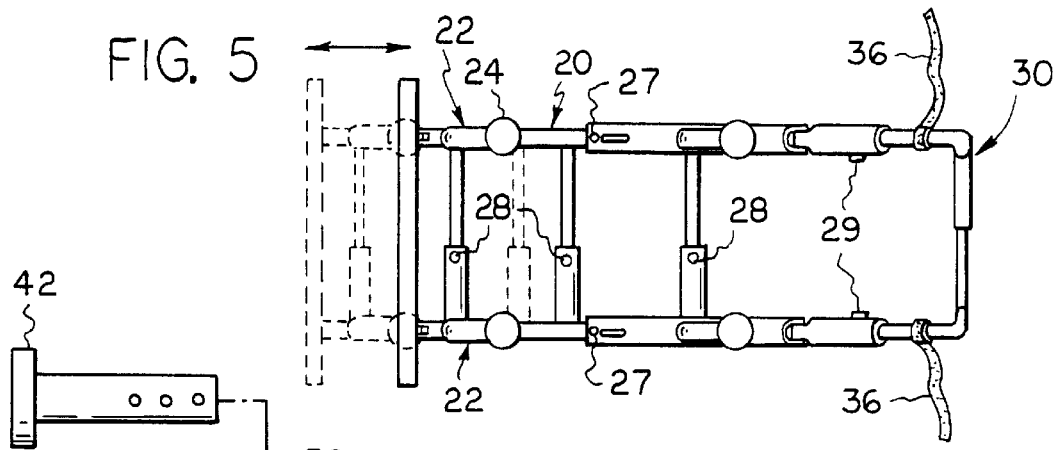
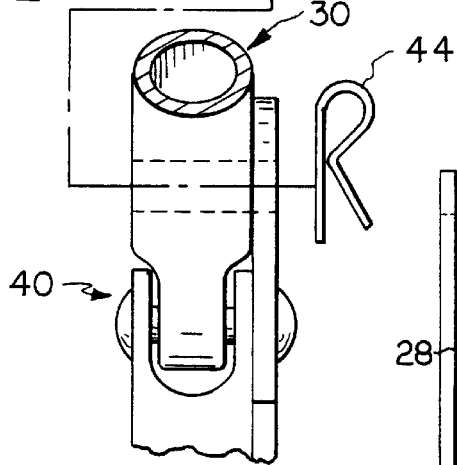
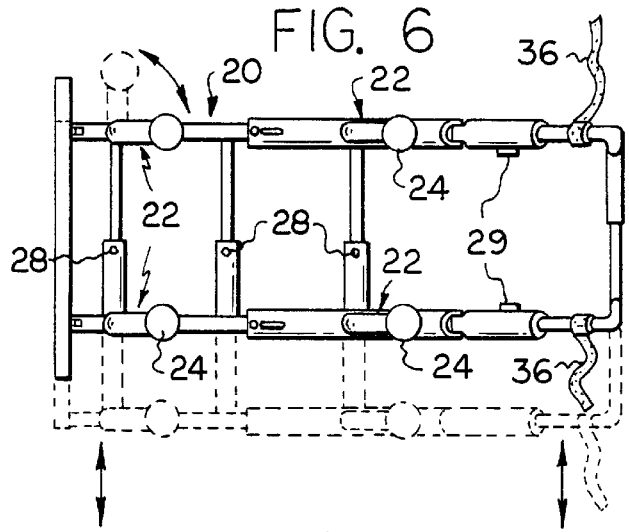
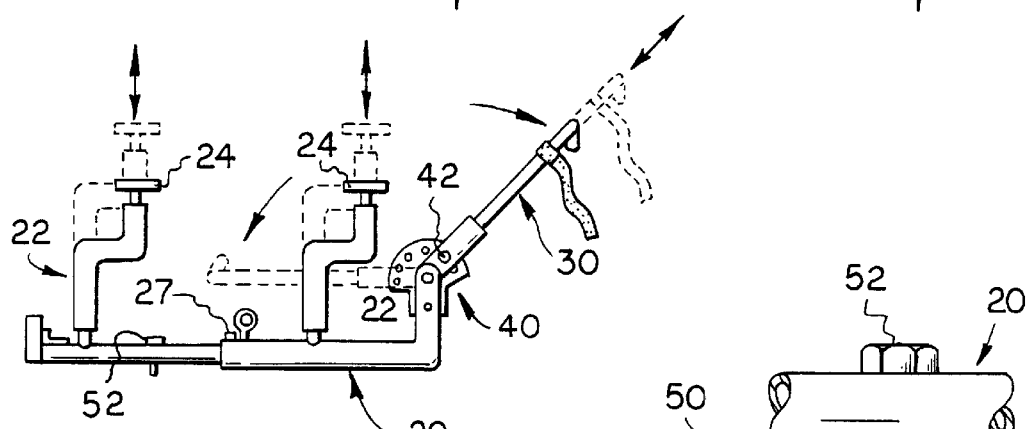
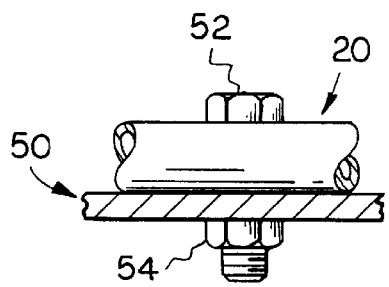

SUPPORT SCAFFOLD FOR VEHICLE STORAGE COMPARTMENT

FIELD OF THE INVENTION

This invention relates generally to devices used to enhance the carrying ability of vehicles and specifically to devices that allow more cargo to be carried securely in the storage compartment.

BACKGROUND

Vehicles, especially passenger vehicles, have difficulty carrying oversized cargo. This cargo is usually put in the rear storage compartment, with the cargo often sticking out of the compartment. Upon acceleration, or deceleration, of the vehicle, the cargo may shift and may even fall out of the vehicle creating a safety hazard. The vehicle, and/or the cargo, may be damaged by the shifting of the oversized cargo and/or by the weight of the load pressing against the edges of the storage compartment, especially if the cargo's center of mass is outside the compartment. Those who transport oversized cargo on a regular basis will often have, or have ready access to, a vehicle designed for transporting such cargo. But, individuals who only have an occasional need to transport such cargo may be forced to rent a larger vehicle at great expense. Devices for carrying oversized cargo in vehicles not designed for such use have been detailed in the prior art, but they are not attractive to individuals who only need to transport oversized cargo infrequently.

Devices disclosed in prior art typically are required to be bolted to the floor of the vehicle storage compartment. A device that requires three brackets to be permanently bolted to the floor is described in U.S. Pat. No. 4,029,245 (Berlin). People who rarely transport oversized cargo may not want to drill holes in the floor of their vehicle's storage compartment. The invention disclosed by Berlin has another disadvantage. It has a tubular cross member beneath which the cargo is positioned and held in place. This design limits the amount of cargo that can be carried to the amount that will fit below the tubular cross member. Thus, individuals using the Berlin invention may be required to make multiple trips to transport the entire load of oversized cargo.

Increases in the number of homeowners performing their own home improvement projects has led to the need for an easy, effective, and economical way to transport materials required for such projects. The Berlin device, by requiring the device to be permanently installed and by limiting the amount of oversized cargo that can be carried in a single trip, may require homeowners to pay substantial costs to rent trucks or to have the materials delivered. The present invention addresses the need for a portable, easily installed and uninstalled, device to safely, securely, and economically carry oversize cargo in vehicle storage compartments.

SUMMARY

This invention is a support scaffold for a vehicle storage compartment comprising an adjustable frame that is temporarily secured within the storage compartment and an adjustable arm extending outside the compartment from the rear end of the frame.

In a preferred embodiment, this device includes an extension that extends down from the adjustable arm to a bumper or trailer hitch. This extension provides extra support for the cargo that sits on the arm by reducing the amount of strain placed on the contact between the cargo and the arm. If the cargo is so long that the center of mass is outside of the compartment, the arm can be extended to prevent an additional moment from being placed on the contact between the cargo and the arm.

The arm has straps to secure the cargo, thus preventing shifting during transport. All of these features help prevent the cargo from falling out of the vehicle during transport and also help to prevent damage that might occur to the cargo or to the vehicle if an attempt is made to transport the cargo without this invention.

Unlike the Berlin device, this invention can be installed and removed without affecting the walls of the compartment. A preferred embodiment includes expansion clamps connected to the frame. The expansion clamps extend to wedge the frame within the compartment, but have cushions on their ends to prevent any damage to the walls of the vehicle. The expansion clamps also allow the device to be rapidly and easily transferred to another vehicle. The frame of the invention is adjustable to allow it to fit into storage compartments of various sizes. A lumberyard could make the device available to their customers, saving the yard time and expense delivering lumber to customers who cannot fit it in their vehicles, as well as saving the customer similar expenses.

The frame is designed to lie flat on the floor and does not have crosspieces above the floor as disclosed by Berlin. This design allows cargo to be stacked through the entire height of the storage compartment. An individual transporting cargo from a store to home will want to make only one trip. This invention allows a vehicle to carry more cargo than those disclosed in the prior art.

It is the primary object of the present invention to provide a means for carrying oversized cargo via a device that is easily installed and removed from a vehicle's storage compartment without altering the storage compartment in any manner.

It is a secondary object of this device to allow the entire height of the storage compartment to be used to hold cargo.

These and other objects, features, and advantages of the present invention will become apparent to those having ordinary skill in the art upon reading the following detailed description of the invention in view of the claims and drawings.

BRIEF DESCRIPTION OF THE DRAWINGS

FIG. 1 is a perspective drawing of a preferred embodiment of this invention.

FIG. 2 is a side view of a preferred embodiment of the invention installed in a storage compartment.

FIG. 3 is an enlarged cross-sectional view of the structure of the expansion clamps taken at plane 3—3 of FIG. 2.

FIG. 4 is an enlarged cross-sectional view of the structure of the mechanism at the base of the arm taken at plane 4—4 of FIG. 1.

FIG. 5 is a top view of the invention showing the frame's length being adjusted.

FIG. 6 is a top view of the invention showing the frame's width being adjusted, and one of the expansion clamps being rotated.

FIG. 7 is a side view of the invention showing the arm being adjusted in angle and in length, and the height of the expansion clamps being adjusted.

FIG. 8 is an enlarged drawing of a section of the frame permanently bolted to the floor of the storage compartment.

DETAILED DESCRIPTION

FIG. 1 shows support scaffold 10, a preferred embodiment of the present invention. The scaffold consists of an adjustable frame 20 and a support arm 30. The preferred embodiment is temporarily fixed in the vehicle storage compartment using expansion clamps 22. Set screws 27 and 28 are used to adjust the length and width of frame 20, respectively, and set screws 26 are used to adjust the configuration of clamps 22. These adjustments are shown in FIGS. 5, 6, and 7.

The cargo rests on support arm 30 during transportation. Support arm 30 has an extension 32 that reaches down to the vehicle bumper or trailer hitch to give further support to the cargo. Extension 32 has an attachment 34 that serves as a connection to a trailer hitch, if desired. Support arm 30 has straps 36 to secure the cargo as shown in FIG. 2. The angle of support arm 30 can be adjusted by adjusting the arm hinge 40, shown in FIGS. 1, 2 and 7; FIG. 4 shows an enlarged cross-section view of arm hinge 40.

The preferred embodiment is shown installed in a vehicle storage compartment in FIG. 2. Frame 20 has been adjusted in height and length to fit the floor of the compartment. Clamps 22 have been adjusted in height and angle to position the anchors 24 to the inside of the top wall of the storage compartment.

FIG. 3 shows, in an enlarged cross-sectional view, anchor 24 of expansion clamp 22 being rotated. Anchor 24 is mounted on a threaded rod to allow it to change in height when rotated and is shown extended to contact the roof of the vehicle storage compartment, to temporarily fix scaffold 10 in the compartment. When scaffold 10 is no longer needed, anchor 24 is retracted allowing scaffold 10 to be removed from the vehicle storage compartment.

FIG. 4 illustrates how pin 42 and clip 44 are used to adjust the angle of support arm 30 with respect to frame 20. To adjust the angle of support arm 30, pin 42 is removed from arm hinge 40 after removing locking clip 44 (see also FIGS. 1, 2, and 7). When arm 30 is at the desired angle, pin 42 is then inserted through the appropriate hole in hinge 40 and clip 44 is then reinserted to keep pin 42 in place.

The adjustability of scaffold 10 is shown in FIGS. 5, 6 and 7. FIG. 5 shows the length of frame 20 being changed. This is accomplished by loosening set screws 27 (shown in FIGS. 1, 2, 5, and 7) and telescoping the concentric frame members. When frame 20 is the desired length, set screws 27 are retightened.

FIG. 6 shows how the width of frame 20 is adjusted and how the configuration of clamps 22 is changed. The change in width is accomplished by loosening set screws 28 and telescoping the concentric frame members to the desired width. An effective change in width can be made by loosening set screws 26 of the clamps (shown in FIG. 1) and rotating clamps 22 around their mounting point on frame 20. When the desired width had been achieved by placing clamps 22 in the desired configuration, set screws 26 are retightened.

FIG. 7 shows arm 30 being adjusted in length and angle, and clamps 22 being moved away from frame 20. As discussed in detail above, when the angle of arm 30 needs to be adjusted, pin 42 is removed, the angle of arm 30 is changed, and pin 42 is replaced. When the length of the arm needs to be changed, set screws 29 (shown in FIGS. 1, 5, and 6) are loosened, arm 30 is telescoped to a different length, and set screws 29 are retightened. The distance between frame 20 and clamps 22 can be changed by loosening set screws 26 (shown in FIG. 1), moving clamps 22 up or down with respect to frame 20, then retightening set screws 26.

Scaffold 10 can be permanently fixed in the vehicle storage compartment, if desired. The bolt used to permanently fix the scaffold to the floor of the storage compartment is shown in FIG. 8. Bolt 52 (shown also in FIGS. 1, 2, and 7) is run through holes in frame 20 and storage compartment floor 50. Nut 54 is then threaded on bolt 52 and tightened.

What is claimed is:

1. A support scaffold for a vehicle storage compartment, comprising:

(a) a frame operatively arranged to be secured within said compartment using clamps, said clamps vertically disposed to contact a top wall of said vehicle storage compartment and said frame having a front end and a rear end; and (b) an arm extending outwardly from said frame proximate said rear end, said arm also extending outside of said compartment.

2. The device in claim 1 wherein said frame is adjustable in length.

3. The device in claim 1 wherein said frame is adjustable in width.

4. The device in claim 1 wherein said arm is adjustable in length.

5. The device in claim 1 wherein said arm is adjustable in angle.

6. The device in claim 1 wherein said arm includes an extension to the vehicle bumper to give additional support to said arm.

7. The device in claim 6 wherein said extension includes an attachment to connect to a vehicle trailer hitch.

8. The device in claim 1 wherein said clamps are expansion clamps.

9. The device in claim 8 wherein said frame is adjustable in length.

10. The device in claim 8 wherein said frame is adjustable in width.

11. The device in claim 8 wherein said arm is adjustable in length.

12. The device in claim 8 wherein said arm is adjustable in angle.

13. The device in claim 8 wherein said arm includes an extension to the vehicle bumper to give additional support to said arm.

14. The device in claim 13 wherein said extension includes an attachment to connect to a vehicle trailer hitch.

* * * * *